United States Patent [19]

Eichenlaub

[11] Patent Number: 5,500,765
[45] Date of Patent: Mar. 19, 1996

[54] CONVERTIBLE 2D/3D AUTOSTEREOSCOPIC DISPLAY

[75] Inventor: Jesse B. Eichenlaub, Penfield, N.Y.

[73] Assignee: Dimension Technologies Inc., Rochester, N.Y.

[21] Appl. No.: 241,008

[22] Filed: May 11, 1994

[51] Int. Cl.⁶ ............................ G02B 27/22; G02B 27/10
[52] U.S. Cl. ....................... 359/463; 359/462; 359/621
[58] Field of Search ................................ 359/463, 466, 359/455, 456, 458, 460, 599, 619, 893, 462, 621, 622; 348/51, 53, 59, 42, 44, 48, 88; 353/7

[56] References Cited

U.S. PATENT DOCUMENTS 4,431,265  2/1984  Benton ......................................... 348/51
5,083,199  1/1992  Börner ......................................... 348/59

Primary Examiner—Paul M. Dzierzynski
Assistant Examiner—Darren E. Schuberg
Attorney, Agent, or Firm—Cumpston & Shaw

[57] ABSTRACT

A convertible 2D/3D autostereoscopic display includes of an electronically controllable display screen for displaying two dimensional images thereon and a permanently mounted first lens sheet for projecting 3D autostereoscopic images in a region of space in front of the display. Another lens sheet is pivotally attached to the display to allow it to be swung into and out of physical optical engagement with the first lens sheet. The lens sheets each have complimentary physical structure and optical properties such that when the lens sheets are engaged, the combined lens sheets have a substantially negligible effect on the two dimensional screen image; while disengagement of the lens sheets resumes the display to the 3D autostereoscopic display mode. Complimentary alignment structure is also provided in corresponding non-lens regions of the lens sheets for aligning the respective lenslets when the sheets are engaged. Conventional latches are also provided to secure the lens sheets when they are engaged. In another embodiment, a lens sheet is selectively engageable with a 2D display to form 3D autostereoscopic images when in a closed position and allow 2D viewing when in an open position.

32 Claims, 3 Drawing Sheets

CONVERTIBLE 2D/3D AUTOSTEREOSCOPIC DISPLAY

BACKGROUND OF THE INVENTION

1. Field of the Invention

The invention relates generally to autostereoscopic displays, and particularly to a convex lenticular lens based autostereoscopic display which is convertible to a full resolution two dimensional image display.

2. Discussion of Related Art

Autostereoscopic imaging, that is, the formation of at least one stereoscopic image pair which can be perceived as a single three dimensional image without the need for color filter, polarizing, or other types of special glasses, can be accomplished by suitably aligning a lens array with the pixel columns of a two dimensional, electronic display. This method of autostereoscopic imaging is described in U.S. Pat. Nos. 5,083,199 (Borner), and 4,959,671 (Bass et al.), for example; and in numerous foreign and domestic publications. It is also appreciated, however, that the resulting autostereoscopic images are limited, at best, to one half the resolution of the two dimensional image on the display screen. This is due to the effect of the lenticular lens which sends left perspective images to the viewer's left eye viewing zone in front of the display screen and right perspective images to the viewer's right eye viewing zone in front of the screen. In other words, all of the light emitted from the pixel columns of the 2D display is divided between at least two or more images (a half resolution left eye image and a half resolution right eye image).

A problem arises when the electronic display is used both for two dimensional imaging applications such as word processing and spreadsheets, as well as three dimensional imaging applications, as many computer system displays are capable of. The lenticular optics for autostereoscopic imaging typically cut down on the screen resolution by at least a factor of one-half due to half of the display showing a left eye image and the other half of the display showing a right eye image. This has the effect of rendering the two dimensional images, such as text, difficult or impossible to interpret. Thus while the display system may well be capable of both two dimensional and three dimensional display modes, the hardware required for displaying autostereoscopic images typically results in either a dedicated two dimensional or three dimensional display system.

One solution to the problem is to provide a display with twice as many pixels in the horizontal direction, and to display 2D images using pairs of pixel columns. This solution, however, is expensive, and in some cases beyond current technology. It is also impractical for the ultimate system supplier who wishes to provide 3D capability to its systems because the display components are typically purchased as off the shelf displays which have standard resolution formats.

Furthermore, in autostereoscopic imaging systems such as those discussed above, the lenticular lens sheets used in combination with the electronic displays are typically permanently mounted to the display screen to maintain their necessary critical alignment with the pixel columns of the screen. For example, the pixels in common high resolution color LCDs and plasma displays of the type used in laptop and notebook computers are on the order of 0.1 mm. wide; and with an active display area of roughly 15 cm. by 20 cm., a misalignment of the lenticules by as little as 14 seconds of arc can cause noticeable degradation in 3D image viewability. Thus, it is impractical to simply remove and replace the lenticular lens from the display screen to switch between a two dimensional and an autostereoscopic viewing mode.

In appreciation of the forementioned problems, the inventor has recognized a need for the ability to convert a display system having the prerequisite imaging capability between a full resolution, two dimensional viewing mode and an autostereoscopic viewing mode in a convenient and cost effective manner.

SUMMARY OF THE INVENTION

It is an object of the invention to provide an image display which is convertible between a two dimensional, full resolution viewing mode and an autostereoscopic, three dimensional viewing mode. As a matter of reference, a lens sheet will always have a front surface facing away from an observer, and a rear surface facing towards the observer.

Accordingly, a convertible image display comprises a display screen for displaying a full resolution, two dimensional image; control means for supplying the display screen with the two dimensional image data, electronically connected to the screen; a first lens sheet fixedly attached to the display screen for forming an autostereoscopic image in front of the screen, as is known in the art; and a second lens sheet which is selectively engageable with the first lens sheet, in which the optical effect of the second lens sheet in combination with the first lens sheet cancels the autostereoscopic image formation by the first lens sheet and allows an observer to view the original two dimensional image on the display screen.

Optically, the first lens sheet includes, for example, a lenticular array, a fly's eye lens array, a diffractive optic or holographic optical element array, a Fresnel lens array, a prism grating array, and other commonly known optical configurations, having distinct physical and/or optical characteristics such as curvature, pitch and index of refraction. In autostereoscopic displays utilizing these imaging methods, the first lens sheet typically is fixedly or permanently mounted on the display screen to ensure the critical alignment required between the pixel array of the electronic display screen and the optical array of the lens sheet. If the front surface of the first lens sheet in contact with the display screen is flat and the rear exposed surface contains the physical and/or optical structure of the lens, as is usually the case, then a second lens sheet placed against the first lens sheet will cancel the autostereoscopic imaging effects of the first lens sheet if the structure of the contacting lens surfaces are physically and optically equal but opposite, the rear surface of the second lens sheet is flat, and the indices of refraction of both lens sheets are substantially the same.

Mechanically, the second lens sheet must be in substantial alignment with the first lens sheet in order to reestablish the original 2-D image with acceptable viewing quality; however, the alignment between the first and second lens sheets is not as critical as the alignment between the first lens sheet and the display screen pixel columns. The necessary degree of alignment between the lens sheets can be accomplished by incorporating complimentary alignment means such as grooves/ridges, pins/holes, protrusions/depressions, and so on, respectively in non-lens regions of the first and second lens sheets, which mutually engage when the lens sheets are coupled together as described above.

In one embodiment of the invention, the first and second lens sheets are cooperatively interconnected by a hinge suitably located in a non lens region of the lens sheets so that the second lens sheet can be swung into/out of physical and optical engagement with the first lens sheet for conversion between a 2-D and a 3-D viewing mode. In order to secure the lens sheets in the engaged, or closed, position the non lens regions of the lens sheets further contain conventional latch means.

In one aspect of the invention, the lenslets of each lens sheet are coplanar.

In another aspect of the invention, the lenslets of each sheet are not coplanar; that is, the structured, or rear surface of the first lens sheet can have a gross positive or negative contour and, consequently, the structured, or front, surface of the second lens sheet will have a complimentary gross surface contour; it being understood that when the two lens sheets are engaged as described, the inner surfaces are nested in one another and the outer surfaces are flat such that the combined lens sheets act as a flat, transparent slab.

In another embodiment of the invention, a lens sheet has a front surface including a lens region and a non lens region, and a flat rear surface. The lens sheet is pivotally mounted to the display screen by a hinge. A non display region of the display screen and the non lens region of the lens sheet each contain complimentary alignment means and latch means which allow the lens sheet to be positioned out of physical/ optical engagement with the screen resulting in the display of a two dimensional image on the screen, and allow the lens sheet to be swung and secured into precisely aligned engagement with the screen for displaying an autostereoscopic image of the display screen image as is known in the art. In this embodiment, the front surface of the lens sheet, that is the surface having physical/optical structure, is the surface immediately adjacent the display screen surface when the lens is in the closed position. This is opposite to the orientation of the first lens sheet as described for the previous embodiment mentioned above.

These and other objects and advantages of the invention will become more apparent when considered with the drawings and the detailed description which follow.

DETAILED DESCRIPTION OF THE INVENTION

Figure 1:
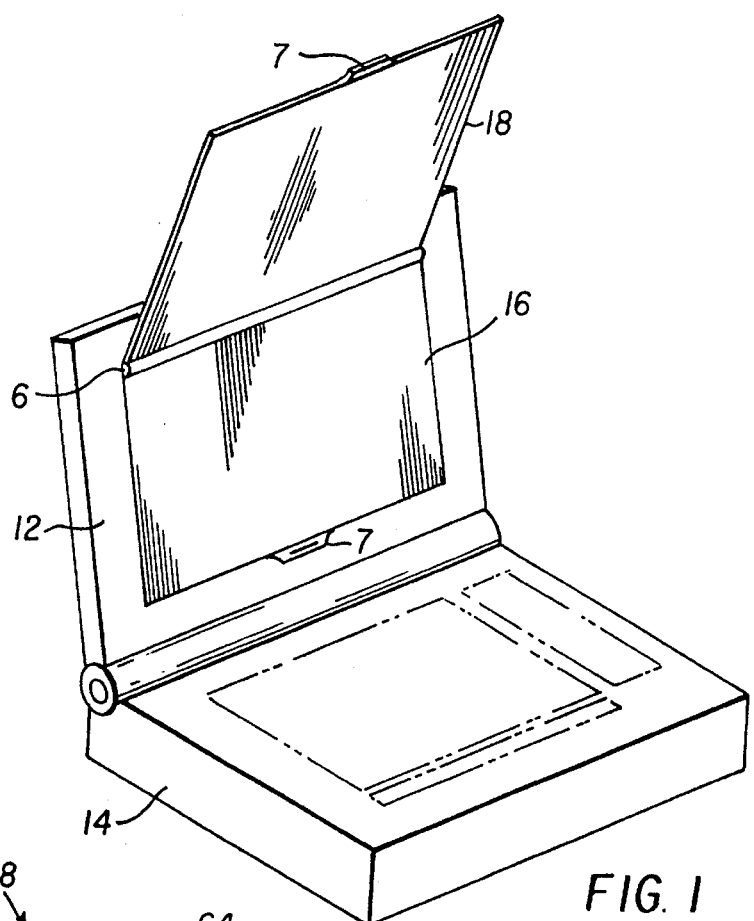
FIG. 1 is a diagrammatic illustration of an embodiment of the invention showing a portable display system having a fixedly mounted first lens sheet on the display screen and a selectively engageable second lens sheet in the open position, for conventional 2D viewing.

A first embodiment of the invention is shown in FIG. 1. A convertible 2D/3D image display 10 includes a display screen 12 for electronically displaying a full resolution two-dimensional image; a control means 14 such as a computer, connected to the display screen, for controlling the two-dimensional image information on the screen; a first lens sheet 16 fixedly mounted on the display screen for autostereoscopic imaging of the two-dimensional screen images according to techniques well known in the art; and a second lens sheet 18 which is selectively engageable with the first lens sheet 16 to convert the display to a 2D viewing mode. The second lens sheet 18 has physical and optical characteristics which cancel the autostereoscopic imaging effect of the first lens sheet 16 when the lens sheets are constructed and engaged as described below.

Figure 2:
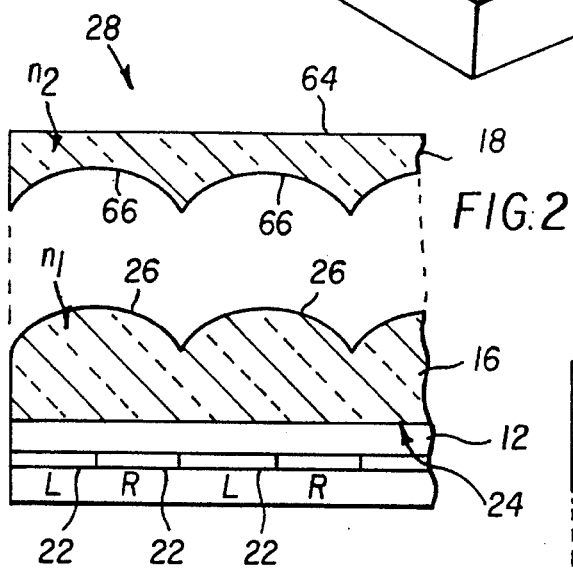
FIG. 2 is a cross sectional plan view of an embodiment of the convertible display showing the first and second lenticular lens sheet surfaces including convex and concave cylindrical lenslets, prior to being closed or coupled.

As shown in FIG. 2, the display screen 12 contains light valves, or pixels, 22, which transmit light as directed by the control means 14, resulting in the display of a two-dimensional-image (not shown) on the display 12, as is known in the art. The light valves are in an array typically arranged in vertical columns and horizontal rows. As is conventionally known in the art, if a lens sheet 16, having a flat front surface 24, and a rear surface 26 including a suitable lens array such as cylindrical, convex, lenticular, lenslets (shown); convex fly's eyes lenslets (see FIG. 6); gradient index lenslets; diffractive or holographic optical elements; or prisms, for example, is precisely aligned with the left eye L and right eye R pixel columns 22 of the display, then a three-dimensional, autostereoscopic image can be projected into a region of space 28 in front of the display for viewing by an observer (not shown) located in front of the display. As described elsewhere herein, lens sheet 16 is typically fixedly mounted to display screen 12 due to the critical alignment requirements between the lenslets 26 and the light valves 22.

When a second lens sheet 18, having an index of refraction $n_2$ substantially equal to the index $n_1$ of the first lens sheet 16, a flat rear surface 64 and a front surface 66 including a lens region which is physically and optically complimentary to the lens region 26 of first lens sheet 16, is engaged with the first lens sheet 16 such that the lens regions 26, 66 are nestingly adjacent, and the lens surfaces 24, 64 are substantially parallel, the combined lens sheets 16, 18 act as a transparent, homogeneous slab having substantially no optical effect on the two dimensional image displayed on the screen.

It is to be understood by reference to the lens surfaces 26, 66 being physically and optically complimentary, that, for instance, if 26 represents a contiguous array of vertical, convex lenticular lenslets of pitch P and each lenslet has a radius of curvature (r), the complimentary lens surface 66 would represent a contiguous array of vertical, concave lenticular lenslets of pitch P, each lenslet having a radius of curvature (−r). This principle would likewise apply to lens sheets in which the optical surfaces 26, 66 lack appreciable physical structure; for example, diffractive lenses or holographic optical elements. Complimentary, in this instance, means that if first lens sheet 16 diffracts the light into location "x", then second lens sheet 18 would inversely diffract the light into location "−x", where |x| is the distance from the lens along the optical axis, with the result that lens sheets 16, 18 in combination would not substantially effect the viewability of the two dimensional screen image.

Figures 6A, 6B:
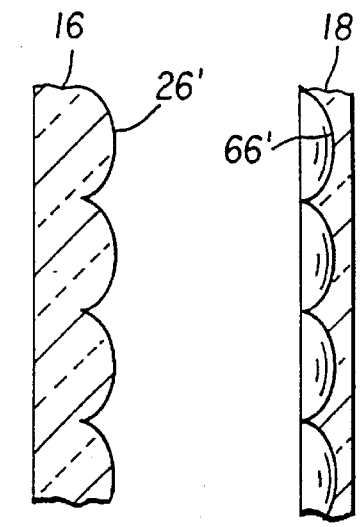
FIG. 6a is a side elevational view of an aspect of the invention in which the first lens sheet has a rear surface including a lens region comprising an array of convex fly's eyes lenses.
FIG. 6b is a side elevational view of the complimentary second lens sheet having a front surface including a lens region comprising an array of concave fly's eye lenses.

FIGS. 6a and 6b show an aspect of the invention in which the first lens sheet 16 comprises an array of convex fly's eye lenslets 26' on a rear surface of the lens sheet, and the second lens sheet 18 comprises an array of complimentary, concave fly's eye lenslets 66' on a front surface thereof. As described herein, the invention contemplates the conversion of an image display between a three dimensional, autostereoscopic imaging mode and a two dimensional imaging mode by engaging and disengaging lens sheets with the display screen or each other to create and cancel the autostereoscopic imaging effects. Therefore, the specific lens arrays illustrated in the various figures are merely exemplary of the scope of lens arrays well known to persons skilled in the art which achieve the objects of the invention.

For convenience in switching between a two dimensional and an autostereoscopic viewing mode, first and second lens sheets 16, 18 are attached by a hinge 6 comounted to corresponding regions of each sheet, as shown in FIG. 1. Hinge 6 allows second lens sheet 18 to be pivoted, or swung, between a closed, or coupled, position with first lens sheet 16, as illustrated in FIG. 2, and an open position up to about 190° with respect to the first lens sheet, as illustrated in FIG. 1. In addition, conventional latch means 7 are also provided between the lens sheets to secure the engagement of the lens sheets when they are in the closed position.

Figure 4:
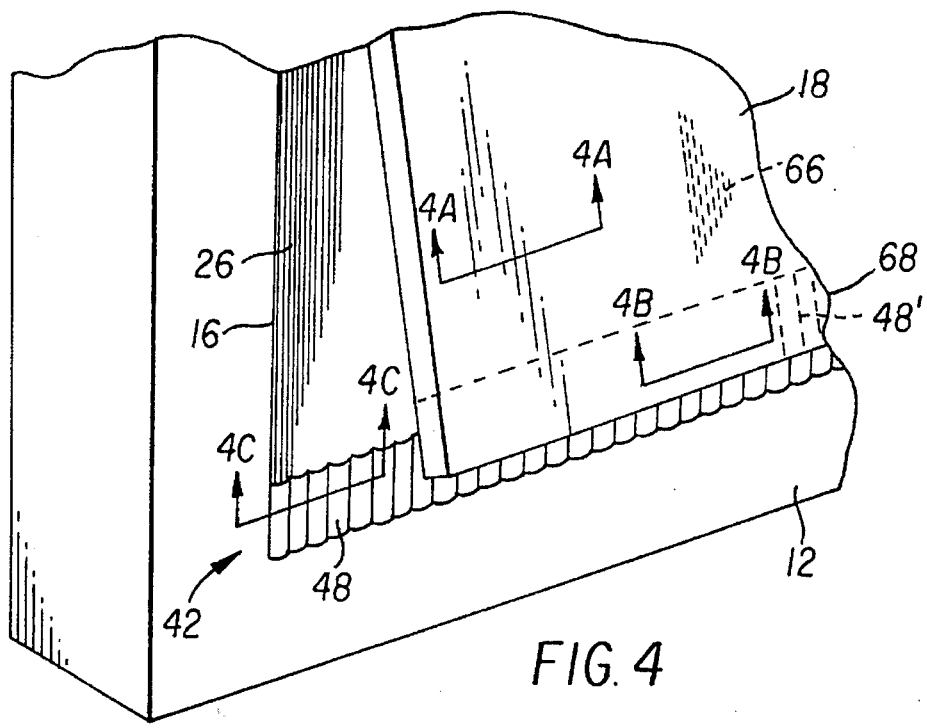
FIG. 4 is a diagrammatic view of a convertible 2D/3D display showing a first lens sheet fixedly mounted to the display screen and having a non-lens alignment region on a rear surface thereof containing representative cylindrical protrusions, and a partially displaced second lens sheet having a complimentary non-lens alignment region on a front surface thereof including representative cylindrical depressions, to aid in the alignment of the lens sheets when they are in the closed position.
Figure 4A:
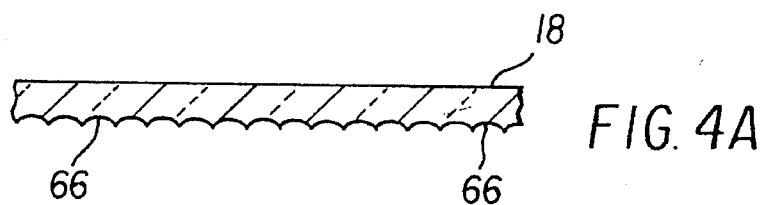
FIG. 4a is a cross sectional view of the lens region of the second lens sheet along line 4a—4a, illustrating the pitch and orientation of the concave, cylindrical lenslets.
Figure 4B:
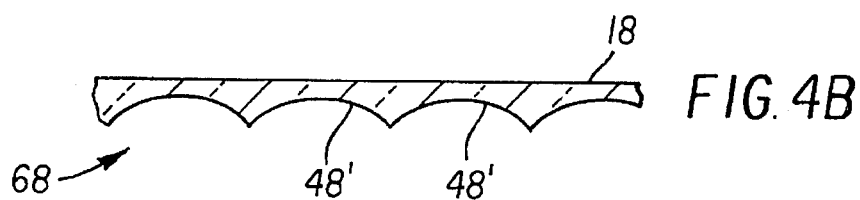
FIG. 4b is a cross sectional view of the non lens region of the second lens sheet along line 4b—4b, illustrating the pitch and orientation of the concave alignment depressions.
Figure 4C:
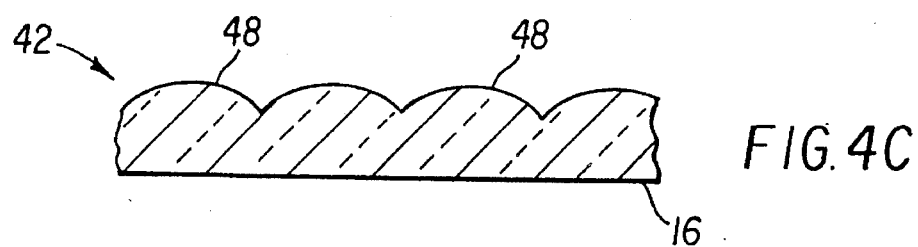
FIG. 4c is a cross sectional view of the non lens region of the fixedly attached first lens sheet along line 4c—4c, illustrating the pitch and orientation of the convex alignment projections which nest with the concave depressions of FIG. 4b when the lens sheets are closed.
Figure 5:
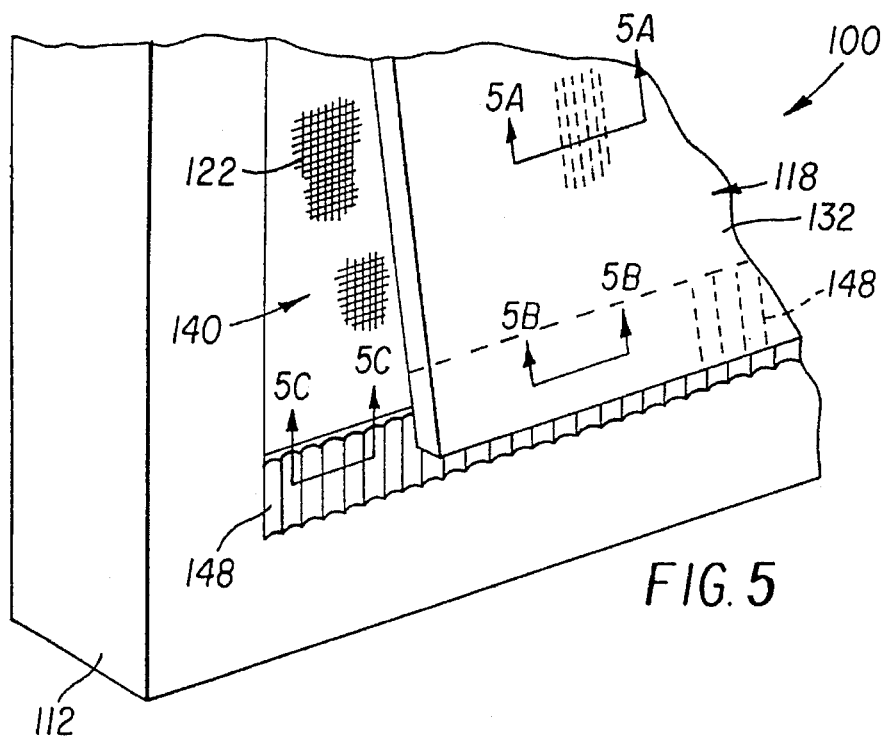
FIG. 5 is an illustrative view of another embodiment of a display showing a display screen having a display region including light valve columns for displaying a conventional 2D image, and a non-display region including alignment means, such as cylindrical depressions; and a lens sheet partially displaced from the screen having a lens region and a non-lens region on a front surface thereof including complimentary alignment means, such as cylindrical protrusions, for aligning the lens region with the light valve columns when the lens sheet is closed against the display screen for displaying 3D autostereoscopic images.
Figure 5A:
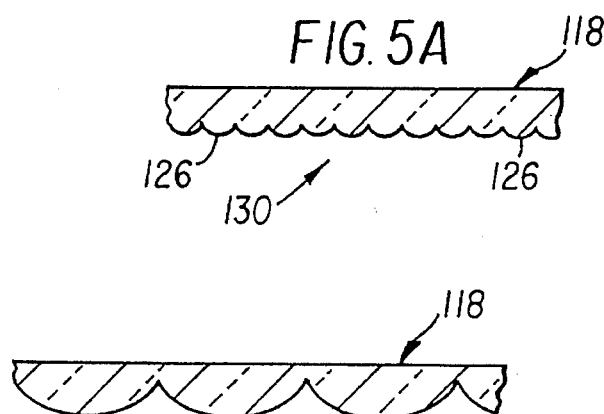
FIG. 5a is an exploded cross sectional view of the lens region of the lens sheet through line 5a—5a showing the convex, cylindrical lenticular lenslets.
Figure 5B:
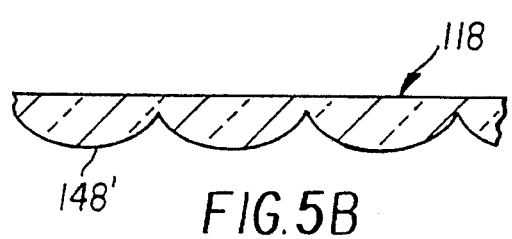
FIG. 5b is an exploded cross sectional view of the non lens region of the lens sheet through line 5b—5b showing the convex, cylindrical alignment projections.
Figure 5C:
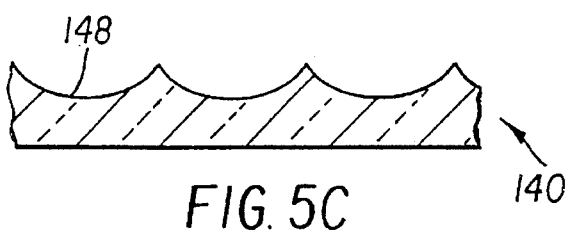
FIG. 5c is an exploded cross sectional view of the non display region of the display screen through line 5c—5c showing the convex, cylindrical alignment depressions which nest with the projections shown in FIG. 5b when the lens sheet is closed against the display screen.

In order to achieve the required alignment of the second lens sheet lenslets 66 with the first lens sheet lenslets 26, to sufficiently cancel the autostereoscopic imaging effects of the first lens sheet, alignment means are provided in corresponding non lens regions of the lens sheets as shown, for example, in FIG. 4. Display screen 12 has mounted thereon first lens sheet 16. Lens sheet 16 includes a rear surface comprising a lens region 26, as previously described, and a non-lens region 42 which contains any of a number of alignment means 48 such as grooves/ridges, pins/holes, and so forth. Likewise, second lens sheet 18 has a front surface including lens region 66, as described above, and non-lens region 68. Non-lens region 68 physically corresponds to non-lens region 42, and contains complimentary alignment means 48'; that is, matching ridges/grooves, holes/pins, and so on. The frequency of the lenslets 26, 66 will typically be very high due to the small size of the lenslets, and although the complimentary physical structure of the lenslets of each sheet will allow the sheets to nest against one another when in the closed position, it preferred that the pitch of the complimentary alignment means be greater than that of the lenslets to ease alignment between the lenslets of each sheet.

Figure 3:
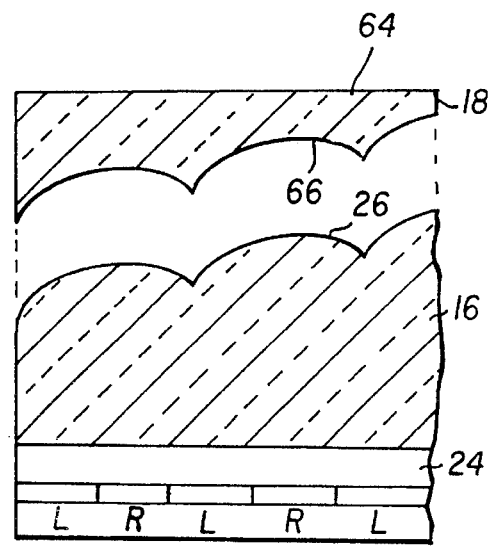
FIG. 3 is a cross sectional plan view of a display in which the engaging surfaces of the lens sheets each have a gross, complimentary contour; for e.g., convex and concave.

In another aspect of the invention, the lenslets of each lens sheet are not coplanar, as is shown in FIG. 3. Front lens sheet surface 24 and rear lens sheet surface 64 are flat, as before; however, lenslet surfaces 26, 66 form a grossly contoured surface, such as concave or convex. Regardless of the lenticular contour of the surfaces, as long as the gross contours are complimentary; that is, if first sheet surface 26 is grossly convex with a radius of curvature $R_1$, for e.g., then second lens sheet surface 66 must be equally and oppositely grossly concave with a radius of curvature ($-R_1$), then when the lens sheets are in the closed position an observer sees an undisturbed 2D screen image. The primary consideration is that when the lens sheets are engaged in the closed position, the lens sheets should have no greater effect on the display screen image than a transparent slab of substantially non refracting glass with parallel faces.

In another embodiment of the invention as shown in FIGS. 5, 5a, 5b and 5c, display 100 includes an electronically controllable display screen 112 having light valves, or pixels, 122 arranged in columns for displaying a two dimensional image on the screen, and a lens sheet 118 pivotally mounted to the display so that sheet 118 can be swung between a closed position in which the front surface 130 of sheet 118 is adjacent to and aligned with light valves 122, and an open position up to about 190° with respect to the display screen. In this embodiment, the rear surface 132 of sheet 118 is flat, and the front surface 130 includes a lenslet array 126 similar to that of lens sheet 16; that is, including an array of vertical, cylindrical, convex lenslets, convex fly's eye lenses, prisms, diffractive lenses, and so on, such that when lens sheet 118 is in the closed position the display projects three dimensional, autostereoscopic images into a region of space in front of the display, as is well known in the art. When lens sheet 118 is flipped up and out of physical and optical engagement with the display screen, full resolution two dimensional images are displayed for viewing.

Hinge and latch means similar to those described above are also provided to permit selective and secure engagement of the lens sheet in the closed and open position.

For alignment purposes, display screen 112 contains a non-display region 148 in addition to display region 140. Lens sheet 118 similarly contains a non-lens region 148' on front surface 130. The non-display and non-lens regions of the display and the lens sheet, respectively, contain complimentary alignment means as described herein above. In this embodiment, however, it is desirable that the complimentary alignment means have sufficient structure to suitably align the lenslets 126 with the light valve columns 122 to form autostereoscopic images; the alignment requirements being well known in the art.

It will be apparent to a person skilled in the art that minor changes, modifications and additions to the invention as described are possible and wholly within the scope of the invention as claimed.

I claim:

1. A 3D autostereoscopic image display having a display screen, the improvement for converting the 3D display to a 2D display, comprising:

a first lens sheet selectively positionable on the display screen for converting the display from a 3D autostereoscopic display mode to a 2D display mode.

2. The display of claim 1 further comprising attachment means for selectively positioning the first lens sheet in one of a closed position and an open position.

3. The display of claim 2 further comprising latching means for selectively securing the first lens sheet in the closed position.

4. The display of claim 3 further comprising a second lens sheet located intermediate the screen and the first lens sheet for forming a 3D autostereoscopic image when the first lens sheet is in the open position and for forming a 2D image when the first lens sheet is in the closed position.

5. The display of claim 4 in which the second lens sheet is fixedly mounted on the display screen.

6. The display of claim 5 in which the first lens sheet comprises a front surface including a lens region selected from a group consisting of lenticular lenslets, fly's eye lenslets, gradient index lenslets, holographic optical elements, diffractive lenses and prisms, and a flat rear surface.

7. The display of claim 6 in which the front surface of the first lens sheet has a gross nonplanar contour.

8. The display of claim 6 in which the second lens sheet and the first lens sheet each include a non lens region including alignment means which have a complimentary structure for aligning the lens sheets in the closed position.

9. The display of claim 8 in which the front surface of the first lens sheet has a gross nonplanar contour.

10. A convertible 2D/3D image display, comprising:

a display screen for displaying a two dimensional image;

control means connected to the display screen for inputting image information to the display screen;

a first lens sheet fixedly attached to a front surface of the display screen for forming a 3D autostereoscopic image of the two dimensional image; and a second lens sheet which is selectively engageable with the first lens sheet for optically canceling the formation of the 3D autostereoscopic image so that the display shows the two dimensional image on the screen.

11. The display of claim 10 in which the first lens sheet has an index of refraction, a flat front surface located immediately adjacent a front surface of the display screen, and a rear surface including a non-lens region and a first lens region having a set of optical parameters sufficient for forming the 3D autostereoscopic image; further in which the second lens sheet has an index of refraction substantially equal to the index of refraction of the first lens sheet, a front surface including a second lens region and a non-lens region, and a flat rear surface, in which the second lens region has a set of optical parameters which are selected to cancel the formation of the 3D autostereoscopic image when the second lens region is in cooperatively aligned contact with the first lens region.

12. The display of claim 11 in which the first lens region is selected from a group consisting of an array of lenticular lenslets, fly's eye lenslets, gradient index lenslets, diffractive lenses and prisms, and the second lens region is respectively selected from a group consisting of an array of lenticular lenslets, fly's eye lenslets, gradient index lenses, diffractive lenses and grooves.

13. The display of claim 11 in which the rear surface of the first lens sheet has a convexly curving profile and the front surface of the second lens sheet has a complimentary concavely curving profile such that the flat surfaces of the first and second lens sheets are in substantially coparallel relationship when the lens sheets are in the closed position.

14. The display of claim 12 comprising engagement means including a hinge connected to the first and second lens sheets for pivotally positioning the second lens sheet between one of a closed position in which the respective lens surfaces of the sheets are in contact and an open position in which the respective lens surfaces are selectively, angularly separated from each other by between about 5° and 190°, and further comprising a latch assembly located on the non-lens regions of the contactable lens sheet surfaces for releasably securing the lens sheets in the closed position.

15. The display of claim 14 comprising alignment means located in corresponding parts of the non-lens regions of the first lens sheet and the second lens sheet for aligning the second lens sheet with the first lens sheet when the lens sheets are in the closed position.

16. The display of claim 15 in which the first lenticular lens region includes a plurality of contiguous, vertically oriented, cylindrical lenslets each of which has a convex radius of curvature, further in which the first lenticular lens region has a fixed lenslet width and pitch, and the second lenticular lens region includes a corresponding plurality of contiguous, vertically oriented, cylindrical lenslets each of which has a concave radius of curvature in which all of the radii of curvature are equal in absolute value, further in which the second lenticular lens region has a fixed lenslet width and pitch equal to the lenslet width and pitch of the first lenticular lens region, whereby the lens sheets have a substantially optically neutral effect on the two dimensional image when the lens sheets are secured in the closed position.

17. The display of claim 15 in which the first fly's eye lens array region includes a plurality of fly's eye lenses each of which has a convex radius of curvature, further in which the first fly's eye lens array region has a fixed lens width and pitch, and the second fly's eye lens array region includes a corresponding plurality of fly's eye lenses each of which has a concave radius of curvature in which all of the radii of curvature ate equal in absolute value, further in which the second fly's eye lens array region has a fixed lens width and pitch equal to the lens width and pitch of the first fly's eye lens array region, whereby the lens sheets have a substantially optically neutral effect on the two dimensional image when the lens sheets are secured in the closed position.

18. The display of claim 15 in which the first gradient index lens array region includes a plurality of radial gradient index lenses in each of which the index of refraction decreases from a center zone to an edge zone of the lens, and the second gradient index lens array region includes a plurality of radial gradient index lenses in each of which the index of refraction increases from a center zone to an edge zone of the lens.

19. The display of claim 15 in which the first diffractive lens array region includes a plurality of diffractive lenses each of which positively diffract light, further in which the first diffractive lens array region has a fixed lens size and pitch, and the second diffractive lens array region includes a corresponding plurality of diffractive lenses each of which negatively diffract light, in which the diffraction by all of the diffractive lenses is equal in absolute value, further in which the second diffractive lens array region has a fixed lens size and pitch equal to the lens size and pitch of the first diffractive lens array region, whereby the lens sheets have a substantially optically neutral effect on the two dimensional image when the lens sheets are secured in the closed position.

20. The display of claim 19 in which the rear surface of the first lens sheet has a convexly curving profile and the front surface of the second lens sheet has a complimentary concavely curving profile such that the flat surfaces of the first and second lens sheets are in substantially coparallel relationship when the lens sheets are in the closed position.

21. The display of claim 15 in which the first prism array region includes a plurality of vertically oriented prism ridges, further in which the first prism array region has a fixed prism width and pitch, and the second groove array region includes a corresponding plurality of grooves each of which has a fixed groove width and pitch equal to the prism width and pitch of the first prism array region, whereby the lens sheets have a substantially optically neutral effect on the two dimensional image when the lens sheets are secured in the closed position.

22. The display of claim 21 in which the rear surface of the first lens sheet has a convexly curving profile and the front surface of the second lens sheet has a complimentary concavely curving profile such that the flat surfaces of the first and second lens sheets are in substantially coparallel relationship when the lens sheets are in the closed position.

23. A convertible 2D/3D autostereoscopic image display, comprising:

a display screen for displaying a two dimensional image;

control means connected to the display screen for inputting image information to the display screen;

a first lens sheet fixedly mounted against a front surface of the display screen, the lens sheet including a flat front surface located immediately adjacent the front surface of the display screen, and a rear surface including a non-lens region and a positive lens region characterized by an index of refraction, a fixed pitch and arrangement;

a second lens sheet selectively engageable with the first lens sheet, having a front surface including a non-lens region and a negative lens region characterized by an index of refraction substantially equal to the index of refraction of the first lens sheet, a fixed pitch and arrangement, which are complimentary to the index of refraction, the pitch and the arrangement of the positive lens region, and a flat rear surface;

a hinge attached to the first and second lens sheets for selectively, pivotally locating the lens sheets between a closed position in which the negative lens region is nested against the positive lens region and an open position in which the second lens sheet is angularly separated from the first lens sheet by between about 5° to 190°;

a latch assembly colocated in the non-lens region of each lens sheet for releasably securing the lens sheets in the closed position; and alignment means for precisely aligning the positive lens region with the complimentary negative lens region when the lens regions are nested in the closed position.

24. The image display of claim 23 in which the positive lens region comprises a lenticular lens including a plurality of contiguous, vertically oriented cylindrical lenslets, in which each lenslet has a uniform, horizontally oriented, convex radius of curvature, further in which the negative lens region comprises a lenticular lens including a plurality of contiguous, vertically oriented cylindrical lenslets, in which each lenslet has a uniform, horizontally oriented, concave radius of curvature.

25. The display of claim 24 in which the rear surface of the first lens sheet has a convexly curving profile and the front surface of the second lens sheet has a complimentary concavely curving profile such that the flat surfaces of the first and second lens sheets are in substantially coparallel relationship when the lens sheets are in the closed position.

26. The image display of claim 23 in which the positive lens region comprises a fly's eye lens including a row by column array of spherical, convex lenslets, further in which the negative lens region comprises a fly's eye lens including a row by column array of spherical, concave lenslets.

27. The display of claim 26 in which the rear surface of the first lens sheet has a convexly curving profile and the front surface of the second lens sheet has a complimentary concavely curving profile such that the flat surfaces of the first and second lens sheets are in substantially coparallel relationship when the lens sheets are in the closed position.

28. The image display of claim 23 in which the positive lens region comprises a plurality of vertically oriented, elongate prisms, further in which the negative lens region comprises a plurality of vertically oriented, elongate grooves.

29. The display of claim 28 in which the rear surface of the first lens sheet has a convexly curving profile and the front surface of the second lens sheet has a complimentary concavely curving profile such that the flat surfaces of the first and second lens sheets are in substantially coparallel relationship when the lens sheets are in the closed position.

30. The image display of claim 23 in which the positive lens region comprises an array of radial gradient index lenses in which the index of refraction decreases from a center zone to an edge zone of the lens, and the negative lens region comprises an array of radial gradient index lenses in which the index of refraction increases from a center zone to an edge zone of the lens.

31. The image display of claim 23 in which the positive lens region comprises an array of positive diffractive lenses, further in which the negative lens region comprises an array of negative diffractive lenses.

32. The display of claim 31 in which the rear surface of the first lens sheet has a convexly curving profile and the front surface of the second lens sheet has a complimentary concavely curving profile such that the flat surfaces of the first and second lens sheets are in substantially coparallel relationship when the lens sheets are in the closed position.

* * * * *